(12) United States Patent
Herf

(10) Patent No.: US 7,873,765 B1
(45) Date of Patent: Jan. 18, 2011

(54) METHOD AND SYSTEM FOR DETECTION OF PERIPHERAL DEVICES AND COMMUNICATION OF RELATED DEVICES

(75) Inventor: Michael Bryan Herf, Studio City, CA (US)

(73) Assignee: Google, Inc., Mountain View, CA (US)

( * ) Notice: Subject to any disclaimer, the term of this patent is extended or adjusted under 35 U.S.C. 154(b) by 566 days.

(21) Appl. No.: 11/096,858

(22) Filed: Mar. 31, 2005

(51) Int. Cl.
*G09G 3/20* (2006.01)
(52) U.S. Cl. .......................... 710/72; 715/740
(58) Field of Classification Search ................. 709/220, 709/221, 222, 200, 206, 207, 224; 710/8; 705/14, 26, 80; 707/3, 7, 104
See application file for complete search history.

(56) References Cited

U.S. PATENT DOCUMENTS

| | | | |
|---|---|---|---|
| 6,151,643 A * | 11/2000 | Cheng et al. ................. 710/36 |
| 6,237,022 B1 * | 5/2001 | Bruck et al. ................. 709/201 |
| 6,266,649 B1 * | 7/2001 | Linden et al. ................. 705/26 |
| 6,453,347 B1 * | 9/2002 | Revashetti et al. ......... 709/224 |
| 6,532,481 B1 * | 3/2003 | Fassett, Jr. ........................ 1/1 |
| 6,725,260 B1 * | 4/2004 | Philyaw ...................... 709/220 |
| 6,873,988 B2 * | 3/2005 | Herrmann et al. ................... 1/1 |
| 6,907,401 B1 * | 6/2005 | Vittal et al. .................... 705/26 |
| 7,031,961 B2 * | 4/2006 | Pitkow et al. ................... 707/4 |
| 7,073,129 B1 * | 7/2006 | Robarts et al. ............... 715/740 |
| 7,076,244 B2 * | 7/2006 | Lazaridis et al. .......... 455/414.2 |
| 7,076,536 B2 * | 7/2006 | Chiloyan et al. ............ 709/220 |
| 7,082,426 B2 * | 7/2006 | Musgrove et al. ................... 1/1 |
| 7,120,590 B1 * | 10/2006 | Eisen et al. ............... 705/14.73 |
| 7,158,986 B1 * | 1/2007 | Oliver et al. ................. 707/102 |
| 7,171,671 B2 * | 1/2007 | Snead et al. ................. 719/321 |
| 7,213,754 B2 * | 5/2007 | Eglen et al. ................. 235/383 |
| 7,289,981 B2 * | 10/2007 | Chang et al. .................... 707/3 |
| 7,302,429 B1 * | 11/2007 | Wanker .......................... 707/7 |
| 7,418,657 B2 * | 8/2008 | Gorelick et al. ............. 715/234 |
| 7,653,748 B2 * | 1/2010 | Borger et al. ............... 709/246 |
| 7,697,791 B1 * | 4/2010 | Chan et al. ................... 382/305 |
| 2001/0020242 A1 * | 9/2001 | Gupta et al. ............. 707/501.1 |
| 2001/0024189 A1 * | 9/2001 | Michie ........................ 345/156 |
| 2002/0049637 A1 * | 4/2002 | Harman et al. ................. 705/26 |
| 2002/0083228 A1 * | 6/2002 | Chiloyan et al. ............... 710/9 |
| 2002/0085025 A1 * | 7/2002 | Busis et al. .................. 345/738 |
| 2002/0087525 A1 * | 7/2002 | Abbott et al. ................... 707/3 |
| 2002/0091779 A1 * | 7/2002 | Donoho et al. .............. 709/206 |
| 2003/0093321 A1 * | 5/2003 | Bodmer et al. ................ 705/26 |
| 2003/0195951 A1 * | 10/2003 | Wittel et al. ................ 709/220 |

(Continued)

OTHER PUBLICATIONS http://windowsupdate.microsoft.com.*

*Primary Examiner*—Cheng-Yuan Tseng
(74) *Attorney, Agent, or Firm*—Blakely Sokoloff Taylor & Zafman LLP

(57) ABSTRACT

Detecting of peripheral devices and communication of related information are described herein. One or more devices are detected. The one or more devices may include a peripheral device coupled to a client. Data regarding the detected devices is obtained. Such data may include information about the devices and their accessories. One or more offerings related to the one or more peripheral device are obtained based on the data. The one or more offerings may include advertisements regarding the devices. The one or more offerings relating to the devices are received at the client. Then, the one or more offerings are presented at the client.

15 Claims, 8 Drawing Sheets

U.S. PATENT DOCUMENTS

| | | | |
|---|---|---|---|
| 2004/0034607 A1* | 2/2004 | Piccinelli | 705/80 |
| 2004/0088180 A1* | 5/2004 | Akins, III | 705/1 |
| 2004/0124255 A1* | 7/2004 | Heerdt | 239/71 |
| 2004/0167928 A1* | 8/2004 | Anderson et al. | 707/104.1 |
| 2004/0215509 A1* | 10/2004 | Perry | 705/14 |
| 2005/0216547 A1* | 9/2005 | Foltz-Smith et al. | 709/200 |
| 2005/0246627 A1* | 11/2005 | Sayed | 715/513 |
| 2005/0251530 A1* | 11/2005 | Handy-Bosma et al. | 707/104.1 |
| 2006/0020510 A1* | 1/2006 | Vest | 705/14 |
| 2006/0064348 A1* | 3/2006 | Li | 705/14 |

* cited by examiner

METHOD AND SYSTEM FOR DETECTION OF PERIPHERAL DEVICES AND COMMUNICATION OF RELATED DEVICES

FIELD OF THE TECHNOLOGY

At least some embodiments of the present invention relate to communication systems in general, and more particularly to detecting peripheral devices and communicating related information over a network.

BACKGROUND

The Internet provides a versatile communication channel for various machines, or communication devices, to communicate with each other. Many applications have been developed to use the Internet to meet various search and communication needs.

For example, search engines provide a powerful tool for locating information in a large database, such as the database of information located on the World Wide Web (WWW). This information is located in response to a query submitted by the user. Typically, a query consists of one or more characters and/or terms.

Using a typical approach, the user enters the query by adding successive terms until all terms are entered. Once the user signals that all the terms of the query have been entered, the query is sent to the search engine. Once the query is received by the search engine, it processes the query, seeks the information responsive to the query, and returns the information to the user.

Because the user is required to undertake the initiative to create and submit the query, the full potential of communicating information between various machines and devices is not realized.

SUMMARY

In one aspect of the present invention, peripheral devices are detected, and data relating to such peripheral devices is obtained. Offerings relating to the detected peripheral devices are obtained using the data. The offerings are provided by a server to a client. At the client, the offerings are displayed.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Described below is a method and system for detecting peripheral devices, obtaining information relating to the devices, and returning offerings in response to the information obtained. Embodiments of the present invention relate to performing searches on behalf of the user and presenting the results of such searches to the user. Various hardware devices (e.g., printers, keyboards, other peripheral devices and their accessories) that are in communication with a client are detected, and relevant data (e.g., model/type of the printer being used) about the devices is gathered. The query server is made aware of the relevant data, which is used by the query server to perform searches of various merchant websites to find advertising information (based on pricing, availability, quality, and such) relating to the detected devices for the user. The advertising information collected by the query server is then presented to the user via the client. The advertising information is to help the user choose one or more merchant websites when shopping for devices and/or their accessories.

Figure 1:
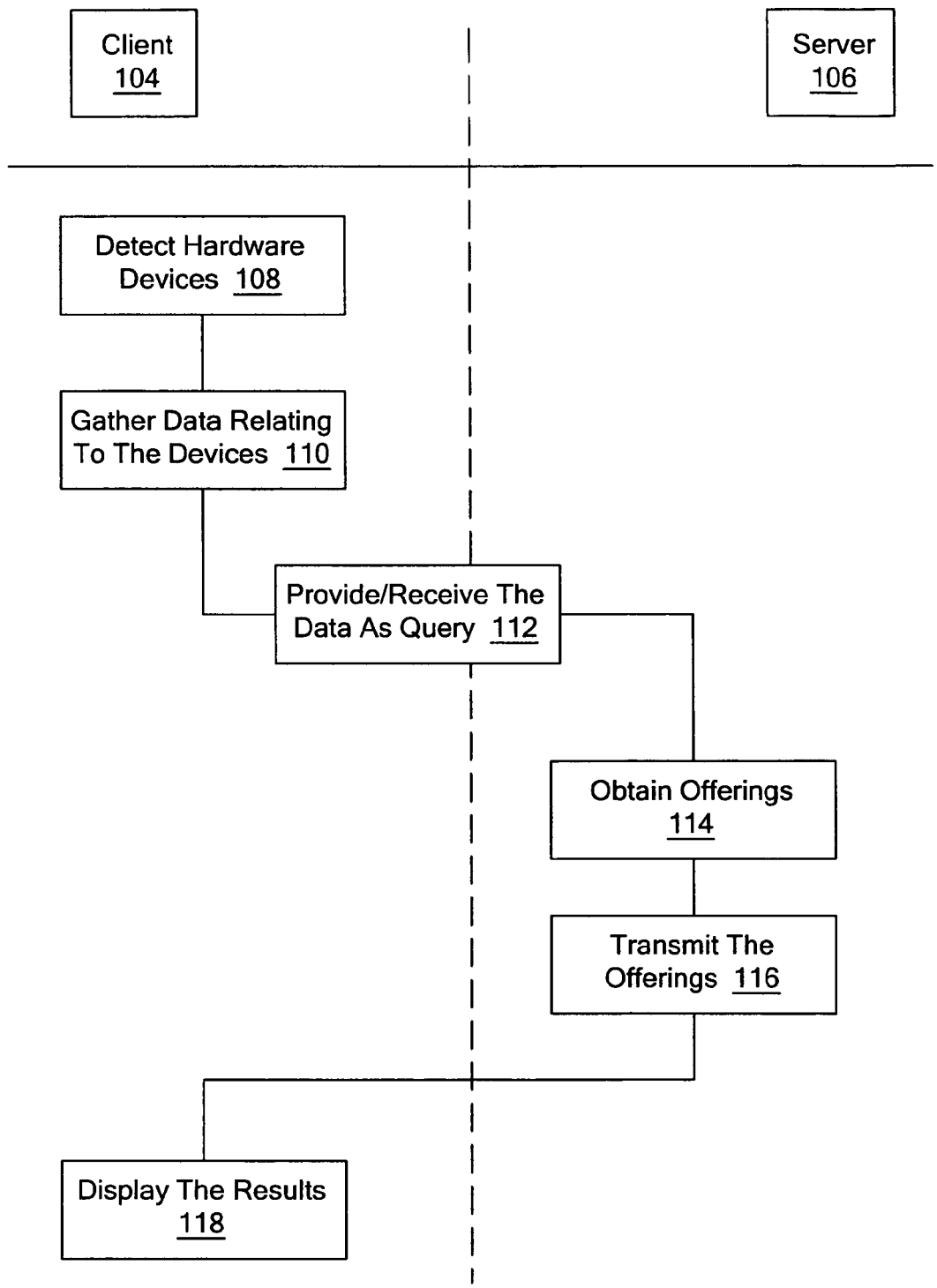
FIG. 1 illustrates a process for detecting devices and communicating information using a client system and/or a server system according to one embodiment of the present invention.

FIG. 1 illustrates a process for detecting devices and communicating information using a client system 104 and/or a server system 106 according to one embodiment of the present invention. As illustrated, a client system (client) 104 is in communication over a network with a server system (server) 106.

In one embodiment, detection of hardware devices (devices) is performed 108 at the client 104 using an application or program residing at the client 104. The devices may include peripheral devices that are in communication with the client 104. Once the devices are detected, relevant data regarding such devices is obtained 110. Such data may include specification and description, such as the type and model information, about the devices and their accessories. In one embodiment, the detection is performed and the relevant data is obtained using an application residing at the client 104.

In another embodiment, an application or program residing at the server 106 is used to perform the detection of devices 108 and the obtaining of the relevant data 110. In this case, the server-based application performs the tasks and proceeds to obtaining offerings 114 using the relevant data obtained.

In case of the client application performing the tasks, the data is then transmitted 112 over to the server 106 as query data to be used by the server 106. The server 106 receives the data 112 and uses it to obtain information about the devices from various sources 114, such as merchant websites, advertising similar devices and/or their accessories. The information obtained is then transmitted 116 to the client 104. The information is displayed 118 at the client 104 for the benefit of the user accessing the client 104.

Figure 2:
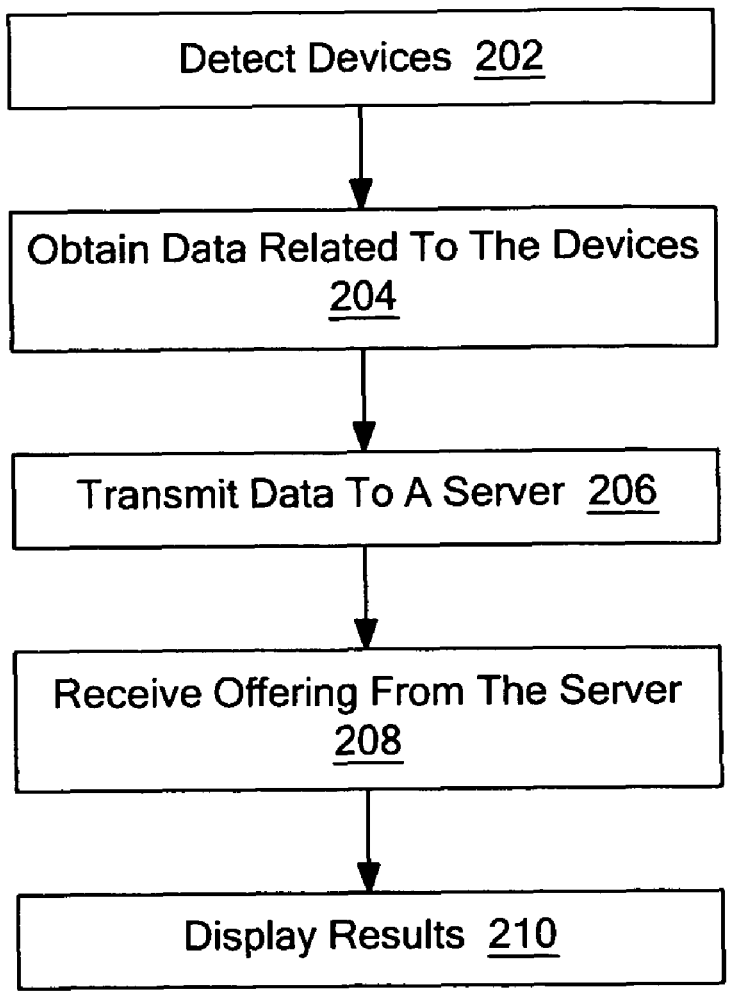
FIG. 2 illustrates a process for detecting devices and communicating information using a client system according to one embodiment of the present invention.

FIG. 2 illustrates a process for detecting devices and communicating information using a client system according to one embodiment of the present invention. At processing block 202, peripheral devices in communication with a client are detected using a client application residing at the client. The client application is further used to obtain data related to such devices at processing block 204. The relevant data obtained is then transmitted to a server for processing at processing block 206. The server uses the data related to the devices to obtain offering, including advertisements, regarding the devices from various sources.

At processing block 208, the client receives the offerings relating to the devices from the server. At processing block 210, results of the offerings obtained are displayed at the client.

Figure 3:
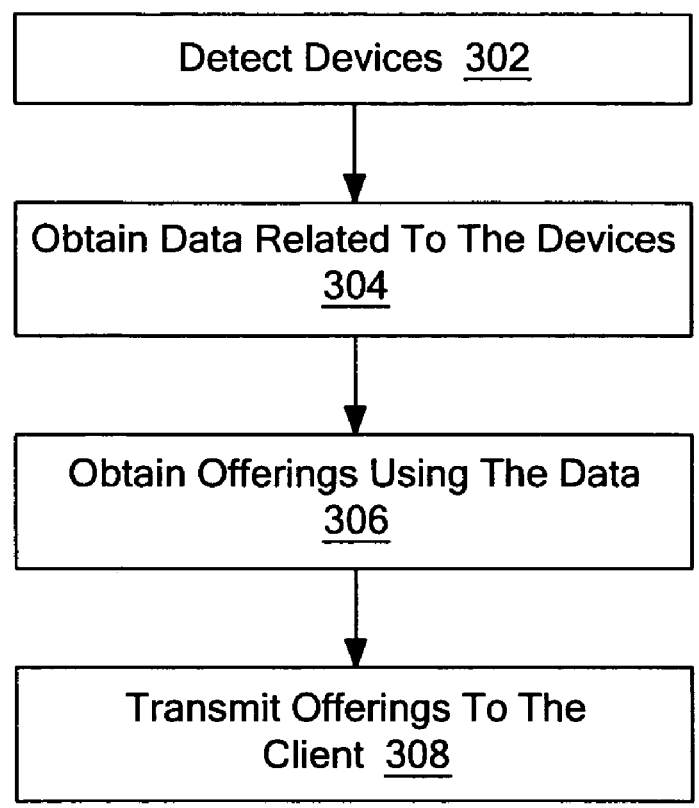
FIG. 3 illustrates a process for detecting devices and communicating information using a server system according to one embodiment of the present invention.

FIG. 3 illustrates a process for detecting devices and communicating information using a server system according to one embodiment of the present invention. At processing block 302, peripheral devices in communication with a client are detected by a server also in communication with the client. At processing block 304, the server obtains data related to the devices. Using the relevant data obtained, the server obtains information, including advertisement offerings, regarding the devices from various merchant sources at processing block 306. The information is then transmitted back to the client at processing block 308, so the client may display the information.

Environment/System

Figure 4:
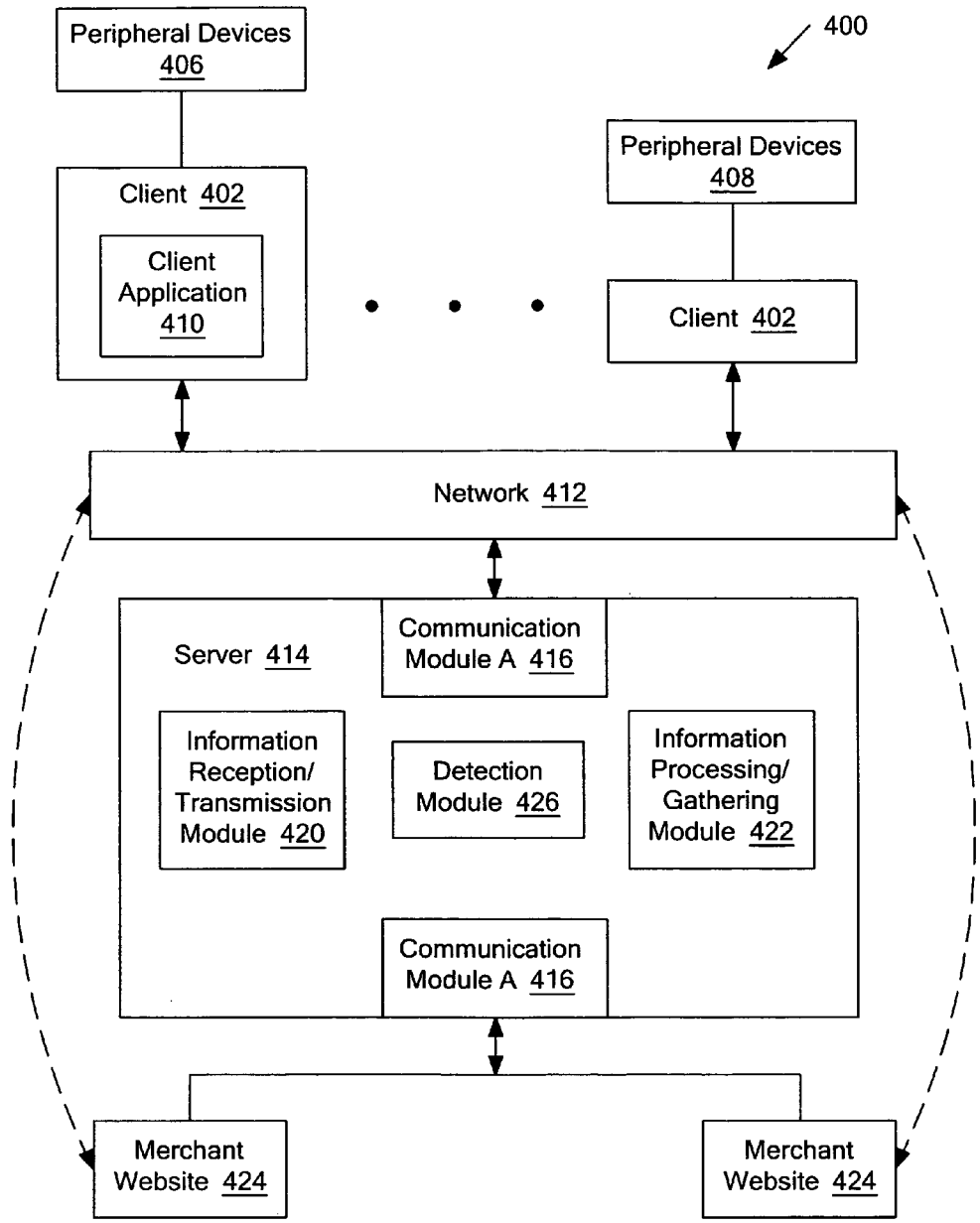
FIG. 4 illustrates a device detection and information communication environment according to one embodiment of the present invention.

FIG. 4 illustrates a device detection and information communication environment 400 according to one embodiment of the present invention. The environment 400 includes one or more client systems 402. In one embodiment, each client 402 may include a client application 410 to facilitate various tasks. The client application 410 may include a software application downloaded onto the client 402 from the server 414. Each client 402 is in communication with the server 414 via a communication network 412, such as Local Area Network (LAN), wireless LAN, Wide Area Network (WAN), Metropolitan Area Network (MAN), Personal Area Network (PAN), Intranet, and the Internet. A user may access the client 402 by, for example, logging on to the client to access the information provided at the client 402.

In one embodiment, the server system 414 may include one or more servers, such as an information communication server to communicate information between the server 414 and various computer systems (e.g., client system 402 and merchant websites 424), an information processing server to process the information being communicated, a query server to perform query and search-related tasks, and a prediction server to predict the results of the tasks performed by other servers (e.g., query server). In one embodiment, one server 414 may sufficiently perform the tasks of many servers.

The server 414 may include one or more communication modules 416-418, an information reception and transmission module 420, an information processing and gathering module 422, and a detection module 426, which may all be interconnected. The communication module 416 may be used to provide an interface with the client 402 via the network 412. Similarly, the communication module 418 may be used to provide an interface between the server 414 and various merchant websites 420 that provide offerings relating to the peripheral devices 406. The server 414 and the merchant websites 424 may also communicate via the same network 412 or via a different network. The offerings may include advertisements on merchant websites 424 about providing for sale the same type (e.g., brand, size, and speed) of the peripheral devices 406, similar types of devices, updates to the devices 406, different, but compatible, types of devices, and the like. Examples of the merchant websites 424 include Froogle.com, eBags.com, Compusa.com, Compuserve.com, Bestbuy.com, Circuitcity.com, and the like.

The client application 410, in one embodiment, provide a detection module to identify, detect, and monitor each of the peripheral devices 406 that are in communication with the client 402. The detection of the device 406 may also include detection of the accessories (e.g., toner for a printer) of such devices 406. The client application 410 may also provide an information processing and gathering module to help gather data relating to the detected devices 406. The data may include a variety of relevant information, such as the type of the device, for the server 414 to later use to gather offerings from merchant websites 424. The detection of the device 406, as well as the gathering of the data, is performed automatically, dynamically, and/or without user intervention.

In one embodiment, the client application 410 further includes an information reception and transmission module to transmit the data to the server 414 and then, to receive the offerings from the server 414. Using a display module, the offerings are then provided to the user in the form of one or more documents having the offerings-related information. In one embodiment, the document may be personalized in accordance with the user's preference as requested by the user. A personalized document, for example, may include a list of uniform resource locators (URLs) of the merchant websites 424 sorted by one or more criterion, such as consumer ranking, popularity, pricing, and the like. In another embodiment, the document presented to the user may not be personalized and include simply a generically sorted document, such as a list of URLs for merchant websites 424 sorted by relevance to the devices 406. The client application 410 may include a software program or application that can be independently obtained or downloaded from a server-sponsored website (e.g., GOOGLE.com).

A "document" as used herein broadly refers to various items, such as files, directories, or other data or information that may be stored, received, sent, created or otherwise processed by one or more computing devices. For example, a document may include any file created on a computing system. The term file as used herein includes a collection of bytes or bits stored as an individual entity. For example, a file may be a binary file, a text file, or a combination thereof, such as a word processor file, a data file, a spreadsheet, a workbook, an image, a drawing, an audio file, a video file, an audio/visual file, a multimedia file, an archive file, a batch file, a source file, an object file, or an executable program. The term file may also refer to a file system object which is accessed as though the object were a file. A document may be linked to one or more other documents, such as via a hyperlink. A document may include a web page, such as a file coded in a markup language (e.g. HyperText Markup Language (HTML), eXtensible Markup Language (XML)), a file coded in a scripting language (e.g. JavaScript, Active Server Pages (ASP), and Perl), or a file viewed in a web browser (e.g. a portable document format (PDF), and an image file or text file). Examples of such web browsers include Microsoft Internet Explore®, Netscape Navigator®, and the like. A document may reside on a single system, or may be accessed by one or more systems via a network, such as an Intranet or the Internet.

It is contemplated that both the server and client systems 402, 414 are capable of supporting various protocols and standards, such as HTML, XML, Wireless Markup Language (WML), HyperText Transport Protocol (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like.

The server 414 receives the data from the client 402 using the reception/transmission module 420. The data is then processed using the information processing and gathering module 422 at the server 414. The processing of the data includes evaluating the data received in terms of determining which queries to form, if necessitated, and which merchant websites 424 to survey to obtain the relevant offerings to transmit back to the client 402. For example, the information processing and gathering module 422 may help facilitate the matching of the information obtained from the data (e.g., the printer name) with the information provided on the merchant websites 424 to select the most relevant offerings, or to facilitate comparing of the offerings obtained from one merchant website 424 to the offerings obtained from another. The information processing and gathering module 422 may further provide a filter to help filter out unnecessary or irrelevant information obtained from the merchant websites 424. One or more filters (e.g., anti-spoofing filter) are contemplated to filter out artificially generated information and submissions. The offerings are then provided to the client 402 using the information reception and transmission module 420.

In one embodiment, the server 414 further includes a detection module 426, which can be used to perform the detection of the devices 406. Stated differently, the detection of the devices 406 can be performed using the server 414 as opposed to using the client application 410 at the client 402. For example, the user may register with the server 414 at a server-sponsored website to provide the server 414 the necessary permission and/or information to perform the detection of devices 406. It is contemplated that the detection may be performed, as necessitated, such as when a new device is added, or it can be performed as requested by the user, or it can also be performed in accordance with predetermined time intervals. Further, the detection of the device 406, as well as the gathering of the data, by the server 414 is performed automatically, dynamically, and/or without user intervention.

In one embodiment, both the data gathered regarding the peripheral devices 406 by the client 402 and/or the server 414 and the offerings collected from the merchant websites 424 by the server 414 may include metadata to provide additional description of the information contained in the data and the offerings. Additional description may also include an HTML tag or a title field in a media file. For example, an HTML tag may be used with the offerings to identify contents of a Web page for the merchant websites 424. Further, the tag may contain a general description of the web pages, keywords, and other information, such as copyright information. Also, the server 414 may display title tags and distribution meta tags as a short summary on the results page. Metadata may include detailed compilations (e.g., data dictionaries and repositories) providing additional information about each of the data elements.

Furthermore, in one embodiment, the data gathered may initially reside with the peripheral device 406 and/or at the corresponding a device driver (driver) connected with the device. The driver may include a hardware device (e.g., a transistor) to provide signals or electrical current to activate a transmission line or display screen pixel. The driver may also include a program routine that links the operating system to the peripheral device 406. For example, when a new device 406 is added to a client 402, a corresponding driver is also loaded to drive the device 406. In another embodiment, the data resides with a basic input output system (BIOS), which includes a set of routines that provide an interface between the operating system and the device 406. The BIOS is further used to provide support for the peripheral device 406 and other internal services. In yet another embodiment, the data, and similarly other information, such as the offerings, may reside at any hardware, software, and/or firmware at the client 402 and/or at the server 414 at any given point in time.

The data regarding the peripheral device 406 may then be obtained by the client 402 and/or server 414 for processing. Whether using the client 402 or the sever 414, the data may be obtained using any combination of hardware and software. For example, the data can be gathered by the client 402 and/or the server 414 using an application, a program, a driver, a device, BIOS, and any combination thereof.

Figure 5:
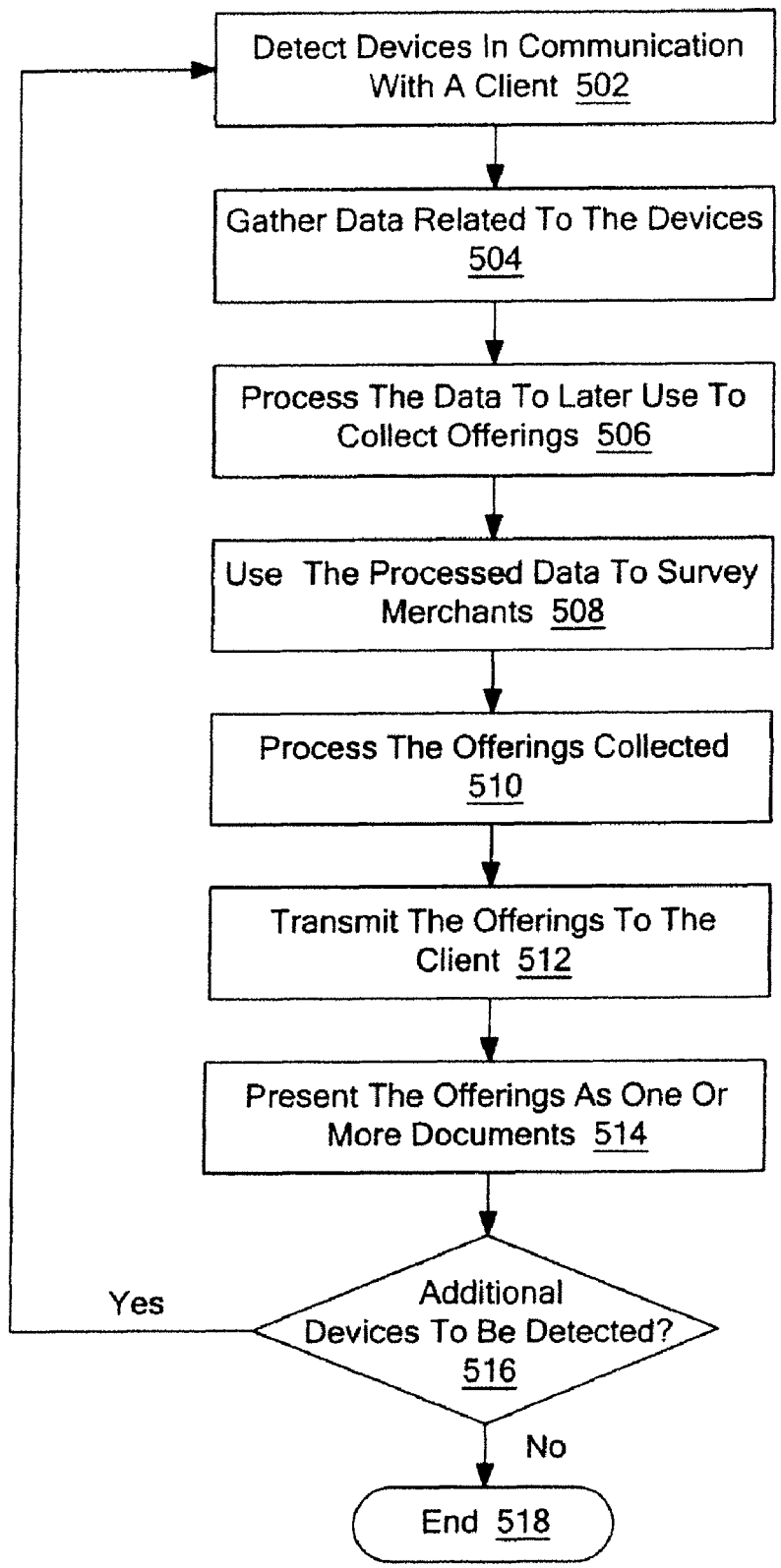
FIG. 5 illustrates a process for detecting devices and communicating information according to one embodiment of the present invention.

FIG. 5 illustrates a process for detecting devices and communicating information according to one embodiment of the present invention. First, each of the peripheral devices connected to a client is detected at processing block 502. Once the devices are detected, data related to such devices is collected at processing block 504. In one embodiment, the detection of the devices and collection of the data are performed by a client application residing at the client. In another embodiment, the detection and collection are performed by the server connected with the client over a network.

The relevant data gathered is processed at the client and/or the server at processing block 506. The processing of the data may include authenticating the data by checking the data for accuracy, relevancy, and for removing any unwanted, unnecessary, and unauthenticated information. At processing block 508, the processed data is used to perform a survey of relevant merchant websites to collect relevant offerings provided by such merchant websites. The collected offerings are then processed at processing block 510. The processing of the offerings may include filtering out any irrelevant and unnecessary information, and it may further include checking the information providing in the offerings for accuracy and authentication.

The offerings are transmitted to the client at processing block 512. The offerings are then provided in one or more documents to the user accessing the client 514. At decision block 516, a determination is made as to whether additional devices are to be detected. If yes, the process continues at processing block 502. If not, the process ends at termination block 518.

Example

Figure 6:
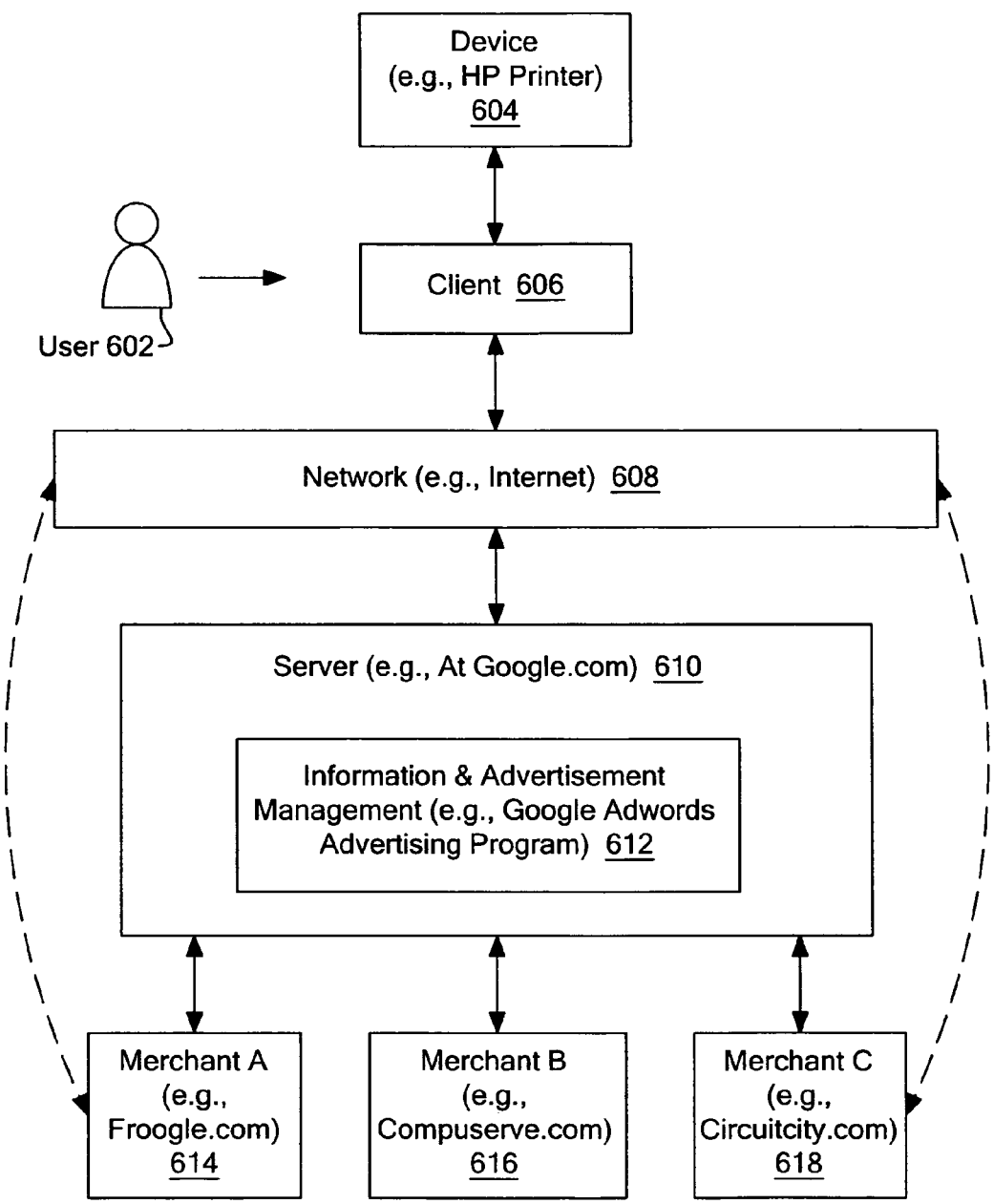
FIG. 6 illustrates an example for using a device detection and information communication system according to one embodiment of the present invention.

FIG. 6 illustrates an example for using a device detection and information communication system according to one embodiment of the present invention. In the illustrated example, a user 602 accesses a client computer system 606, which is connected with a peripheral device (e.g., Hewlett Packard (HP) printer) 604. The client 606 is further in communication with a host server computer system 610, such as GOOGLE's server system (e.g., via the website, GOOGLE.com) through a network 608 (e.g., the Internet).

In one embodiment, the HP printer 604 is detected and data regarding the device 604 is gathered. For example, the data includes the basic identification-related information, such as HP Color LASERJET 2550 Printer. However, the data may also include a more detailed information about the device 604, such as the printer speed (e.g., 20 ppm in black and white, and 4 ppm in color), and the printer resolution (e.g., 600×600 dpi). The data may also include information about various accessories connected with the device 604. For example, the accessory-related data may include information regarding the ink cartridge (e.g., HP Print Cartridge Q3960A) or about the cables being used (e.g., Belkin Gold Series Universal Serial Bus (USB) 2.0 Cable). The data is obtained and processed by the server 610.

The server 610, in one embodiment, may employ an information and advertisement management (management) 612, such as GOGGLE ADWORDS ADVERTISEMENT PROGRAM (ADWORDS). Such management 612 may provide various modules, controls, and interfaces to obtain and receive the data related to the device 604 and use the data to obtain offerings from various merchants 614-618. The merchants 614-618 may include merchant websites (that may or may not be partners with host server, such the server at GOOGLE) that provide advertisements relating to the device 604 and its accessories. Examples of merchant websites include Froogle.com 614, Compuserve.com 616, and Circuitcity.com 618. It is to be noted that FIG. 6 is illustrated merely an example and that the figure and its components (e.g., management 612, etc.) are not limited to advertisement and/or advertisement-related product listings. For example, ADWORDS can be used (1) to match device characteristics to keywords and then to output the matching advertisement creatives (i.e., the ad text); and (2) to use the device characteristics as a query (e.g., at froogle.com, google.com, etc.) for retrieving and outputting product-related results, which are not regarded as advertisements (e.g., a Froogle.com result typically links to a merchant's site, and neither the result nor the target site is regarded an advertisement). Further, relevant links (e.g., relating to reviews of products and/or related products) may also be provided.

For example, using the GOOGLE ADWORDS-based management 612, keywords-related tasks are performed using various terms as keywords (e.g., HP, printer, LASERJET, and color). Further, the keywords-related tasks may include performing queries by matching the keywords using various GOOGLE-based online advertising options and techniques, such as broad match, phrase match, exact match, and negative match. The offerings include (1) advertisement information relating to the device 604 and other related products and services; and (2) non-advertisement information relating to the device and other related products and service. For example, the advertisement-based offerings may include: (1) similar HP printers (as the detected device 604) being offered at Froogle.com 614 for a lower price than other merchants; (2) similar HP printers, accessories, and services being offered at Compuserve.com 616; and (3) a variety of printers, including those that are upgrades to the device 604, other related products, and services being offered at Circuitcity.com 618.

The non-advertisement-based offerings, for example, may include (1) search results derived from merchant sites 614-618 (e.g., results of a crawl that are not regarded as advertisements, such as performing a search relating to the HP printer 604 or a Canon digital camera and providing the results on Froogle.com); (2) direct feeds from the merchant sites 614-618 to the server 610; (3) links to merchant sites 614-618; (4) advertisements linking to the merchant sites 614-618; and (5) links to various device-related communities (e.g., HP printer community, Canon digital camera community, etc.) on social networks, such as Orkut.com.

In one embodiment, the device-related information is used to identify and output the offerings containing advertisements for the device 604, and related and/or relevant products and services; and, in another embodiment, the device-related information is used to conduct one or more searches to provide the offerings containing product and/or service-related information that is derived from or by linking to the merchant websites 614-618 (e.g., by using the Froogle search engine). It is to be noted that the product and/or service-related information in the later instance is not advertisement-related.

In the illustrated embodiment, the user 602 accesses the client system 606 that includes or is in communication with the device 604. The merchant sites 614-618 are in communication with the client 606 and the server 610 via the network 608. The merchant sites 614-618 are used to provide information, some of which may be related to the device 604. At the server 610, data relating to the device 604 is obtained and used to further obtain offerings from one or more merchant sites 614-618. Such offerings may include advertisement-related information as well as non-advertisement-related information. The offerings (including advertisement and/or non-advertisement information) are then presented at the client 606 or at any other client (e.g., the user 602 can obtain the information via an email using any number or types of clients) via the network 608. It is contemplated, and as described in this document, the network communication between various entities (e.g., server 610, client 606, user 602, etc.) may be through a combination of one or more of WAN, LAN, MAN, PAN, Internet, Intranet, BLUETOOTH, and the like.

Furthermore, the offerings are provided to the user 602 as one or more documents for viewing. The user 602 may choose to view the offerings provided by or contained in the document and use it for a variety of tasks, such as shop at one or more merchant websites 614-618. Further, the offering may be provided using toolbars (e.g., GOOGLE Toolbar), blogs (GOOGLE Blogger), photo processing applications (e.g., Picasa Photo Organizer), emails (e.g., Gmail.com), and the like. For example, using a photo processing application (e.g., Picasa Photo Organizer) at the server 610, the offerings may be provided via (1) an email (e.g., Picasa email, etc.), (2) an image file (e.g., Tagged Image File (TIF), TIF Format (TIFF) file, BitMaP (BMP) file, Graphic Interchange Format (GIF) file, Photoshop (PSD) file, Portable network Graphics (PNG) file, etc.), (3) a video file (e.g., Audio Video Interleaved (AVI) file, Moving Pictures Experts Group (MPEG) file, Advanced Systems Format (ASF) file, Windows Media Video (WMV) file, etc.), (4) a slideshow (e.g., Loop slideshow, MPEG Audio Layer 3 (MP3) slideshow, etc.), and (5) a message (e.g., an automatic or manual online message/update, a message/update when starting the system, a desktop icon, special effects, etc.), and the like. It is contemplated that other components, modules, tools, and techniques may be implemented when using different applications (e.g., using PICAS A PHOTO ORGANIZER instead of using the illustrated ADWORDS Advertising Program) at the server 610 to achieve compatibility and performance, and to further refine the use of the data for decreasing costs and increasing efficiency.

Client and Server Architecture/Hardware

Figure 7:
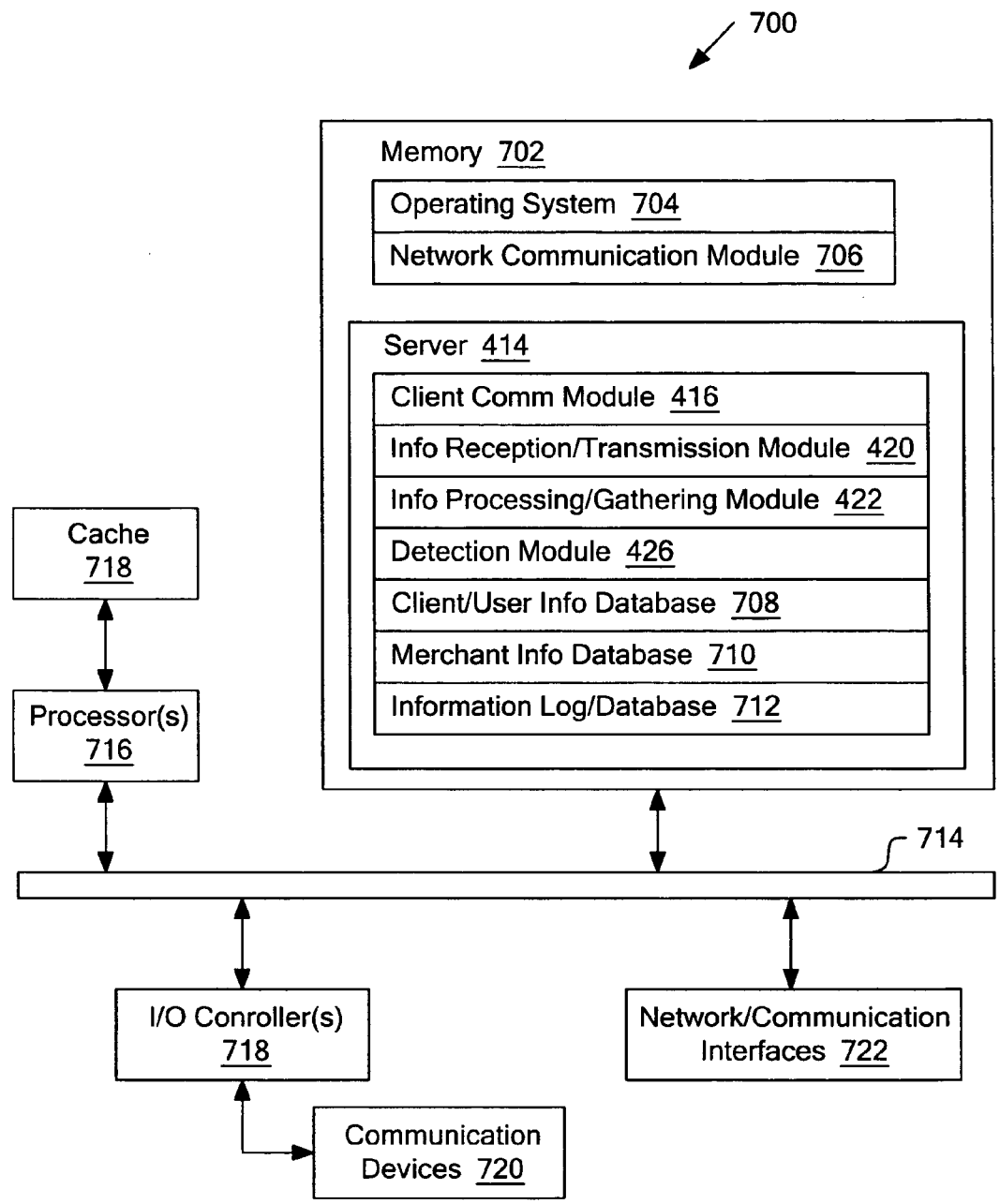
FIG. 7 illustrates a server architecture according to one embodiment of the present invention.

FIG. 7 illustrates a server architecture 700 according to one embodiment of the present invention. While FIG. 7 illustrates various components of a computer system, it is not intended to represent any particular architecture or manner of interconnecting the components as such details are not germane to the present invention. Other systems that have fewer or more components may also be used with the present invention.

The illustrated embodiment of the server architecture 700 includes an inter-connect 714 (e.g., bus and system core logic) to interconnect memory 702 and one or more processors 716, which are coupled with cache memory 718. The inter-connect 714 interconnects the processor 716 and the memory 702 together and further interconnects them to one or more communication devices 720 via one or more input/output (I/O) controllers 718. The inter-connect 714 may include one or more buses coupled with one another through various bridges, controllers, and/or adapters. In one embodiment the I/O controller 718 includes a USB adapter for controlling USB peripherals, an IEEE-1394 bus adapter for controlling IEEE-1394 peripherals, and the like.

The memory 702 may include Read Only Memory (ROM), volatile Random Access Memory (RAM), and non-volatile memory, such as hard drive, flash memory, etc. Volatile RAM is typically implemented as dynamic RAM (DRAM) which requires power continually in order to refresh or maintain the data in the memory. Non-volatile memory typically includes a magnetic hard drive, a magnetic optical drive, or an optical drive (e.g., DVD RAM), or other type of memory system which maintains data even after power is removed from the system. The non-volatile memory can also include a random access memory although this is not required. Further, the non-volatile memory can include a local device coupled directly to the rest of the components in the data processing system. A non-volatile memory that is remote from the system, such as a network storage device coupled to the data processing system through a network interface such as a modem or Ethernet interface, can also be used.

The memory 702 stores an operating system 704, which may include a network communication module 706. The operating system 704 may include procedures for handling various basic system services and for performing hardware dependent tasks. Examples of the operating system 704 include LINUX®, UNIX®, Windows®, OS/390®, OS/400®, and the like. The network communication module 706 is configured with a host/computer name and an internet protocol (IP) address and stores a media access control (MAC) address (721) of a network interface device. The network communication module 706 may include instructions used for connecting the server architecture 700 to other computers via wired and/or wireless network/communication interfaces 722, such as the Internet, WAN, LAN, MAN, and the like.

In one embodiment, the server architecture 700 includes a server 414 (e.g., data processing system), such as an information communication server (e.g., for communicating information), an information processing server (e.g., for processing information), a query server (e.g., for receiving or forming queries based on the information received), a prediction server (e.g., for returning predictions based on the queries received or formed at the query server), and the like. In the illustrated embodiment, the server 414 includes various elements, sub-elements, modules, and sub-modules for performing various tasks relating to communicating and processing of information. For example, the server 414 may include a client communication module 416 to facilitate communication of information with various computer systems.

In one embodiment, the server 414 further includes an information reception and transmission module 420 for receiving information (e.g., data related to the detected devices) from the client and for transmitting information (e.g., offerings from merchant websites) to the client. An information processing and gathering module 422 not only helps gather information, but also facilitates processing of such information. The server 414 further includes a detection module 426 capable of detecting peripheral devices connected with the client. The detection module 426 works with other modules, such as modules 420-422, to inform them of the detected devices, so that other modules 420-422 can efficiently perform their tasks.

In the illustrated embodiment, the server 414 further provides client/user information database 708, merchant information database 710, and information log/database 712. The client/user information database 708 refers to a database containing information relating to one or more clients and one or more users accessing such clients. Such information may have been provided by the clients and/or user (e.g., the user providing information when registering with the server 414), or the information may have been detected along with the detection of the peripheral devices. This information, for example, may be used to generate user and/or client profiles for the purposes of obtaining efficiency and accuracy in information communication and processing.

The merchant information database 710 may include information relating to various merchants that are in communication with the server 414. As with the client/user information database 708, the merchant information database 710 uses information obtained from the merchants to provide better efficiency and accuracy in communicating and processing information. The information log/database maintains a variety of information that serves as a historical reference when receiving, processing, and transmitting information, such as device-related data and offerings. For example, information log/database may include a list of historically popular keywords and queries, client/user preferences, and past offerings provided by certain merchants. It is contemplated that the server 414 may include additional or fewer modules (e.g., the server 414 may include a spelling module to verify spellings of keywords) and that many of the tasks may be delegated to separate modules (e.g., a transmission module performs transmission of information, and a reception module performs reception of information). Further, it is contemplated that more than one server 414 may be used, as preferred or necessitated.

Figure 8:
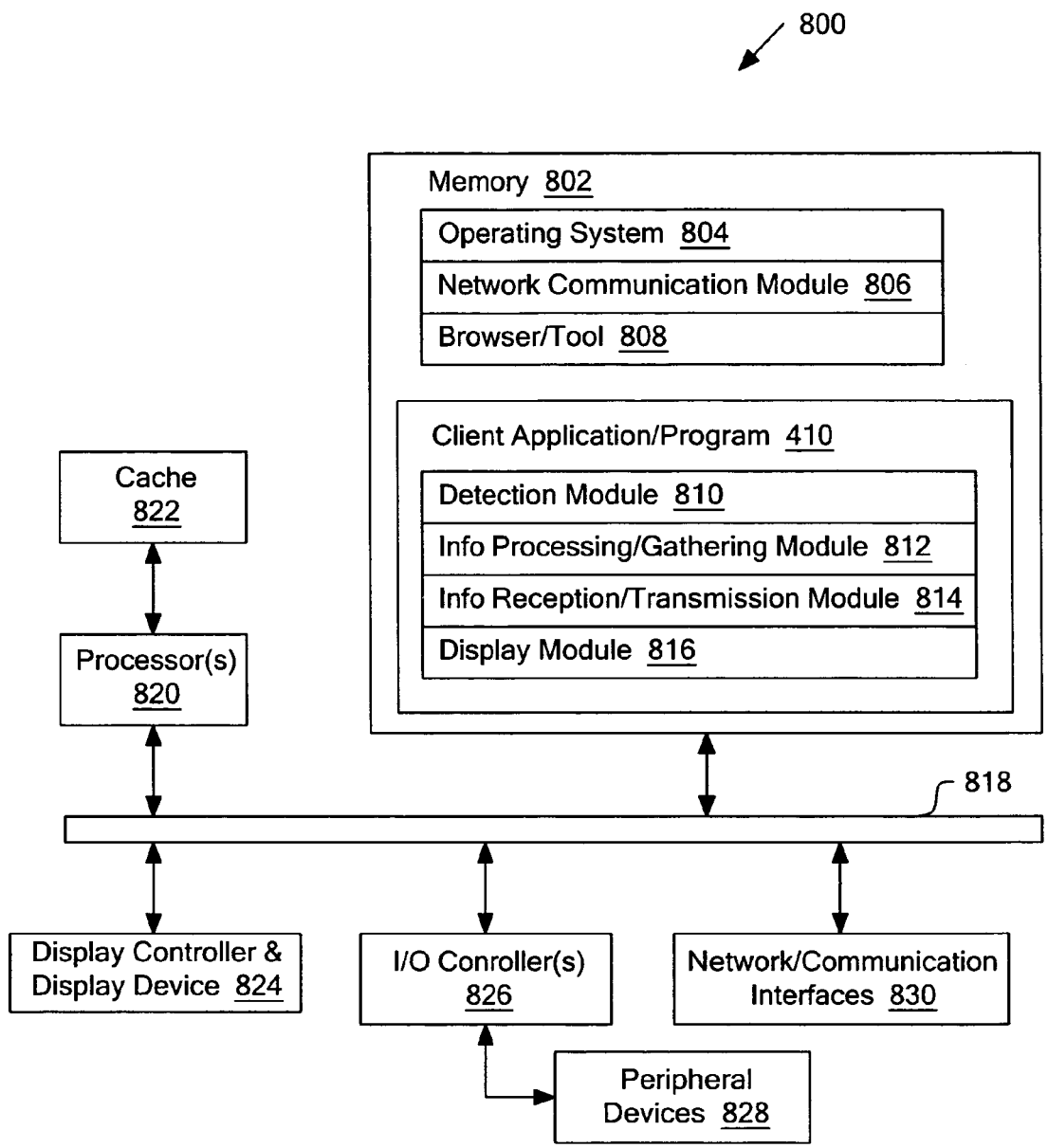
FIG. 8 illustrates a client architecture according to one embodiment of the present invention.

FIG. 8 illustrates a client architecture 800 according to one embodiment of the present invention. While FIG. 8 illustrates various components of a computer system, it is not intended to represent any particular architecture or manner of interconnecting the components as such details are not germane to the present invention. Other systems that have fewer or more components may also be used with the present invention. For example, a system in the form of personal digital assistant (PDA) or cellular phone can be configured in a similar way for use with embodiments of the present invention. Further, some components described above with reference to FIG. 7 can also be employed in FIG. 8.

In the illustrated embodiment, the client architecture 800 includes an inter-connect 818 coupling a memory 802 with one or more processors 820 coupled with cache memory 822. The inter-connect 818 connects the processors 820 and memory 802 to one or more display controllers and devices 824 and to one or more peripheral devices, such as I/O devices 828, through one or more I/O controllers 826. The peripheral devices 828 include keyboards, mice, modems, network interfaces, printers, scanners, video cameras, disks, fax machines, graphics tablets, joysticks, paddle I/O controllers, and the like. The inter-connect 818 further connects additional one or more network and communication interfaces 830.

The memory 802 stores an operating system 804, a network communication module 806, and a browser/tool 808. The operating system 804 may include procedures for handling various basic system services and for performing hardware dependent tasks. Examples of the operating system 704 include LINUX®, UNIX®, Windows®, OS/390®, OS/400®, and the like. The network communication module 806 may include instructions that are used for connecting the client architecture to other computers via the communication network interfaces 830 and communication networks, such as the Internet, LAN, WAN, MAN, and the like. The browser or tool 808 is used for providing interfacing with a user to input requests, preferences, queries, and to display the documents containing offerings. The browser or tool 808 may include graphical user interface (GUI)-based tools and/or an web browsers, such as MICROSOFT EXPLORER, NETSCAPE NAVIGATOR, and the like.

The memory 802 further stores a client application or program 410 that is independently obtained or downloaded onto the client from a server. The client application 410 includes various elements, sub-elements, modules, and sub-modules to perform various tasks. For example, a detection module 810 is provided to perform detection and identification of peripheral devices 828 that are part of the client architecture 800. An information processing and gathering module 812 is used to gather information (e.g., data relating to the peripheral devices 828), and to process the gathered information. Further, an information reception and transmission module 814 is provided to transmit the processed information to the server, and to receive information (e.g., offerings) from the server. A display module 816 is used to display the information as one or more documents using the browser and/or tool 808 for the benefit of the user.

General

Throughout the foregoing description, for the purposes of explanation, numerous specific details are set forth in order to provide a thorough understanding of the embodiments of the present invention. It should be apparent, however, to one skilled in the art that the embodiments of the present invention may be practiced without some of these specific details. In other instances, well-known structures and devices are shown in block diagram form to avoid obscuring the underlying principles of the present invention. References to one or an embodiment in the present disclosure are not necessarily references to the same embodiment; and, such references mean at least one.

The description and drawings are illustrative and are not to be construed as limiting the invention. Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache, a remote storage device, and the like.

In various embodiments, hardwired circuitry may be used in combination with software instructions to implement the present invention. Thus, the techniques are not limited to any specific combination of hardware circuitry and software or to any particular source for the instructions executed by the data processing system.

In addition, throughout this description, various functions and operations are described as being performed by or caused by software code to simplify description. However, those skilled in the art will recognize what is meant by such expressions is that the functions result from execution of the code by a processor, such as a microprocessor.

A machine-readable medium can be used to store software and data which when executed by a data processing system causes the system to perform various methods of the present invention. This executable software and data may be stored in various places including for example ROM, volatile RAM, non-volatile memory, cache, and the like. Portions of this software and/or data may be stored in any one of these storage devices.

Thus, a machine-readable medium includes any mechanism that provides (i.e., stores and/or transmits) information in a form accessible by a machine (e.g., a computer, network device, personal digital assistant, manufacturing tool, and any device with a set of one or more processors). For example, the machine-readable medium may include, but is not limited to, floppy diskette, optical disk, compact disk-ROM (CD-ROM), magneto-optical disk, ROM, RAM, erasable programmable ROM (EPROM), electrically erasable programmable ROM (EEPROM), magnetic or optical storage media, flash memory devices and another type of media/machine-readable medium suitable for storing electronic instructions.

Various methods are described and also are described forms of apparatus, which perform these methods, including data processing systems which perform these methods, and computer-readable media which when executed on data processing systems cause the systems to perform these methods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A machine-implemented method, comprising:

obtaining data at a server coupled to a network, the data relating to a peripheral device coupled to a client in communication with the server over the network, wherein the data comprises information describing characteristics of the peripheral device and any attached accessories of the peripheral device, and metadata to further describe the information, wherein the data is automatically gathered from the client over the network without user intervention;

processing the data at the server to facilitate surveying a plurality of merchant websites over the network based on the data automatically gathered from the client without user intervention, the surveying including matching the data obtained from the client and relating to the peripheral device with information displayed on each of the plurality of merchant websites over the network to select offerings relating to the peripheral device;

obtaining the offerings relating to the peripheral device from the merchant websites based on the matching; and processing the offerings to be presented on a display device at the client via a web browser, wherein the offerings include advertisement information relating to at least one of the peripheral device, accessories of the peripheral device, products relating to the peripheral device, or services relating to the peripheral device, and search results including non-advertisement information obtained using at least a portion of the data as query information.

2. The machine-implemented method of claim 1, further comprising obtaining the data by the client using one or more of the following: the peripheral device, a client-based driver, a client-based basic input output system (BIOS), and a client-based application.

3. The machine-implemented method of claim 2, further comprising transmitting the data from the client to the server to facilitate the obtaining of the offerings, wherein the transmitting of the data is performed via the network including one or more of the following: a Local Area Network (LAN), a Wide Area Network (WAN), a Metropolitan Area Network (MAN), a Personal Area Network (PAN), an intranet, or the Internet, wherein the network is a wired network, a wireless network, or a combination thereof.

4. The machine-implemented method of claim 1, wherein obtaining the data by the server comprises using one or more of the following: the peripheral device, a server-based driver, a server-based BIOS, or a server-based application.

5. The machine-implemented method of claim 1, wherein the non-advertisement information comprises one or more of the following: information derived from one or more merchant websites or information linking to the merchant websites.

6. The machine-implemented method of claim 1, wherein the non-advertisement information comprises one or more of the following: rating information relating to the peripheral device or review information relating to the peripheral device.

7. The machine-implemented method of claim 6, wherein the non-advertisement information further comprises one or more of the following: rating information relating to the products or the services relating to the peripheral device or review information relating to the products or the services relating to the peripheral device.

8. The machine-implemented method of claim 1, wherein the offerings are presented using a document, wherein the document comprises a file including one or more of the following: a word processor file, a data file, a spreadsheet, a workbook, an image file, a drawing, an audio file, a video file, an audio/video file, a multimedia file, an archive file, a batch file, a source file, an object file, or an executable program.

9. The machine-implemented method of claim 8, wherein the document comprises a web page having a file coded in one or more of the following: markup language, extensible markup language, or scripting language, or a file viewed using a web browser.

10. The machine-implemented method of claim 1, wherein the presenting of the offerings is further performed using one or more of the following: an email, a web browser, a toolbar, a blog, a desktop icon, or a photo processing application.

11. A system, comprising:
means for obtaining data, at a server coupled to a network, the data relating to a peripheral device coupled to a client in communication with the server over the network, wherein the data comprises information describing characteristics of the peripheral device and any attached accessories of the peripheral device, and metadata to further describe the information, wherein the data is automatically gathered from the client over the network without user intervention;
means for processing the data at the server to facilitate surveying a plurality of merchant websites over the network based on the data automatically gathered from the client without user intervention, the surveying including matching the data obtained from the peripheral device coupled to the client with information displayed on each of the plurality of merchant websites to select offerings relating to the peripheral device;
means for obtaining the offerings relating to the peripheral device from the merchant websites based on the matching; and
means for processing the offerings to be presented on a display device at the client via a web browser, wherein the offerings include advertisement information relating to at least one of the peripheral device, accessories of the peripheral device, products relating to the peripheral device, or services relating to the peripheral device, and search results including non-advertisement information obtained using at least a portion of the data as query information.

12. The system of claim 11, further comprising means for accessing the plurality of merchant websites to obtain the offerings relating to the peripheral device, wherein the offerings include the advertisement information and non-advertisement information.

13. The system of claim 11, wherein the means for processing the offerings to be presented on the display device comprises means for communicating the offerings to the client via one or more of the following: an email, a web browser, a toolbar, a blog, a desktop icon, or a photo processing application.

14. A non-transitory machine-readable medium having stored thereon sets of instructions which, when executed by a machine, cause the machine to perform operations comprising:
obtaining data at a server coupled to a network, the data relating to a peripheral device coupled to a client in communication with the server over the network, wherein the data comprises information describing characteristics of the peripheral device and any attached accessories of the peripheral device, and metadata to further describe the information, wherein the data is automatically gathered from the client over the network without user intervention;
processing the data at the server to facilitate surveying a plurality of merchant websites over the network based on the data automatically gathered from the client without user intervention, the surveying including matching the data relating to the peripheral device coupled to the client with information displayed on each of the plurality of merchant websites to select offerings relating to the peripheral device;
obtaining the offerings relating to the peripheral device from the merchant websites, based on the matching; and
processing the offerings to be presented at the client via a web browser, wherein the offerings include advertisement information relating to at least one of the peripheral device, accessories of the peripheral device, products relating to the peripheral device, or services relating to the peripheral device, and search results including non-advertisement information obtained using at least a portion of the data as query information.

15. The non-transitory machine-readable medium of claim 14, wherein the data is obtained by the server using one or more of the following: the peripheral device, a server-based driver, a server-based BIOS, or a server-based application.

* * * * *